(No Model.)
W. P. WHITE.
BELT COUPLING.
No. 450,901. Patented Apr. 21, 1891.
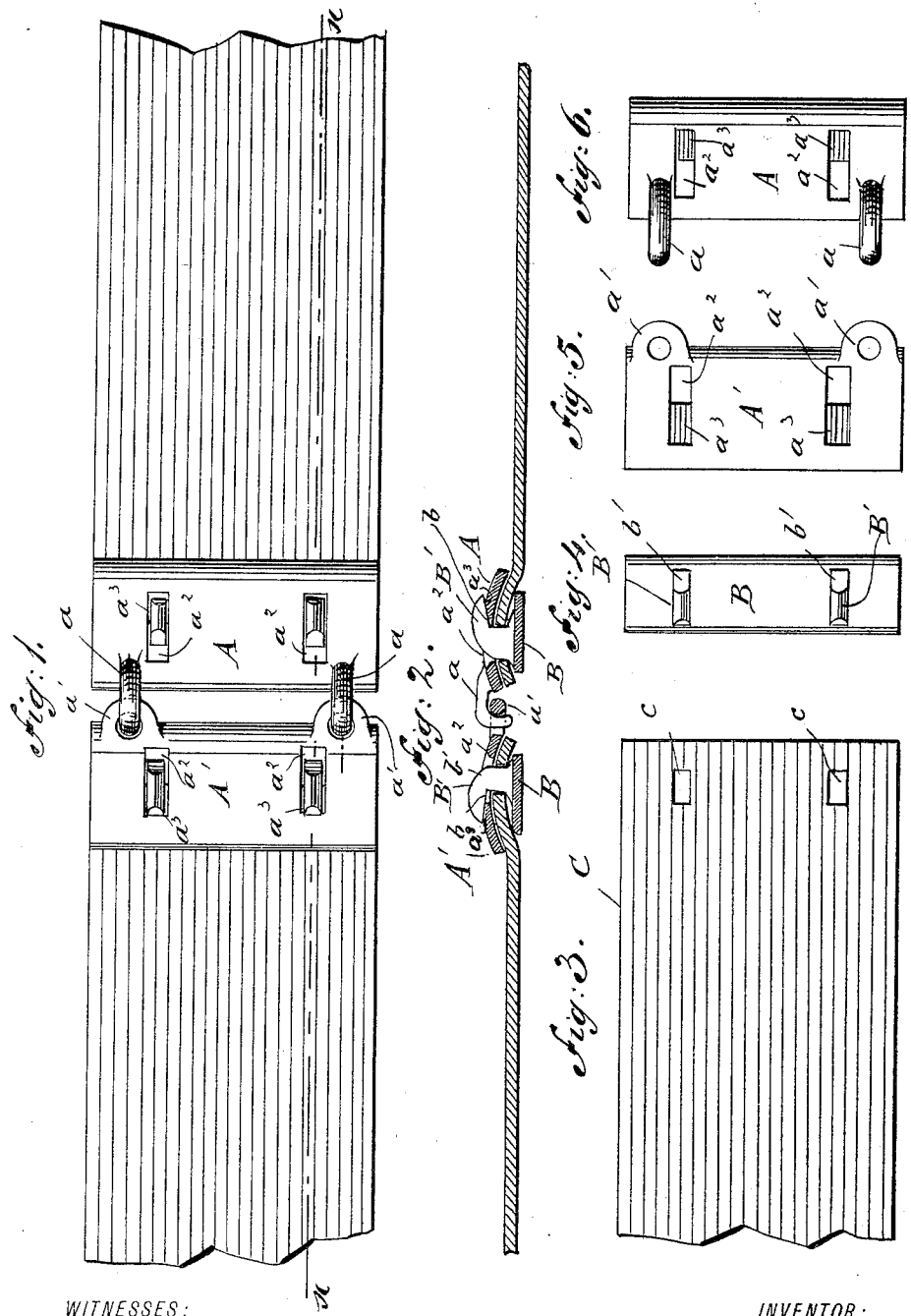
WITNESSES:
Chas Nida
C. Sedgwick
INVENTOR:
W. P. White
BY Munn & Co
ATTORNEYS

UNITED STATES PATENT OFFICE.

WILLIAM P. WHITE, OF VOLUNTOWN, CONNECTICUT.

BELT-COUPLING.

SPECIFICATION forming part of Letters Patent No. 450,901, dated April 21, 1891.

Application filed August 13, 1890. Serial No. 361,913. (No model.)

*To all whom it may concern:*

Be it known that I, WILLIAM P. WHITE, of Voluntown, in the county of New London and State of Connecticut, have invented a new and Improved Belt-Coupling, of which the following is a full, clear, and exact description.

My invention relates to improvements in belt-couplings; and the object of my invention is to produce a simple, durable, and inexpensive metal belt-coupling that may be quickly and easily attached to the belt, that will run smoothly over the pulleys, and that will fasten the ends of the belt in such a manner that they will not readily tear.

To this end my invention consists in certain features of construction and combinations of parts which will be hereinafter fully described, and specifically pointed out in the claims.

Reference is to be had to the accompanying drawings, forming a part of this specification, in which similar letters of reference indicate corresponding parts in all the views.

Figure 1 is a broken plan view of a belt provided with a coupling embodying my invention. Fig. 2 is a longitudinal section through the belt and coupling on the line $x\ x$ of Fig. 1. Fig. 3 is a broken plan view of one end of the belt, showing the apertures therein to facilitate the attachment of the coupling. Fig. 4 is a detail plan view of a portion of the coupling which is attached to the inner side of the belt, and which serves as a wedge. Fig. 5 is a detail plan view of one of the main coupling-pieces, and Fig. 6 is a detail plan view of the opposite coupling-piece.

The coupling has two main coupling-pieces A and A', which are attached to opposite ends of the belt, the coupling-piece A having hooks $a$ projecting from one edge thereof, and the coupling-piece A' having corresponding projecting eyes $a'$ to receive the hooks. The coupling-pieces A and A' are both curved outwardly, as shown in Fig. 2, and both are provided with transverse slots $a^2$, having beveled portions $a^3$ at the rear end thereof.

The coupling-clamp B is adapted for attachment to the coupling-piece A or A'. It comprises a flat base corresponding in length to the length of the coupling-pieces A and A', but which is considerably narrower than said coupling-pieces. The base may be also slightly curved, if desired, to correspond with the curvature of the coupling-pieces. Projecting outwardly at right angles to the base are the hooks B', adapted to extend through the slots $a^2$ in the coupling-pieces. The hooks B' are provided with wedge-shaped openings $b$, so that the belt and the coupling-pieces will be wedged into the entrance of the hook, as described below, and the outer portion of the hook is beveled slightly, as at $b'$, to enable it to easily enter the slots.

The belt C, to which the couplings are to be attached, is provided with apertures $c$ near the end, corresponding in size to the size of the hooks B', and to attach the coupling the coupling-pieces A and A' are placed on the outer side of the belt near the ends, and the hooks B' on the clamps B are inserted through the apertures $c$ in the belt and the slots $a^2$ in the coupling-pieces, the hooks being inserted in such a manner that their openings will be in opposite directions. The hooks $a$ of the coupling-piece A are then hooked into the eyes $a'$ of the coupling-piece A', and when the strain is applied to the belt the clamps B will be drawn closely into the concave portion of the coupling-pieces, and the coupling-pieces and belt will be firmly wedged into the entrance of the hooks. It will thus be seen that the strain upon the belt will not come upon the portions opposite the apertures $c$, but it will be divided across the whole width of the belt, as the belt will be wedged firmly between the coupling-pieces and the clamps. The clamps will also be drawn in closely, so that they will run smoothly over the pulleys.

The couplings are made of malleable metal and may be made in any desired size.

Having thus described my invention, I claim as new and desire to secure by Letters Patent—

1. A belt-coupling comprising two coupling-pieces having interlocking hooks and eyes and having transverse slots therein, and clamps corresponding in length to the length of the couplings and having projecting hooks thereon to extend through the slots of the coupling, subtantially as described.

2. A belt-coupling comprising two outwardly-bent coupling-pieces having interlocking hooks and eyes and having transverse slots therein, and clamps adapted to enter the concave portions of the coupling-pieces and provided with projecting hooks adapted to extend through the slots of the coupling-pieces, substantially as described.

3 The combination, with a belt, of outwardly-bent coupling-pieces having interlocking hooks and eyes and having transverse beveled slots therein, and clamps adapted to enter the concave portions of the coupling-pieces and provided with hooks adapted to extend through apertures in the belt and through slots in the coupling-pieces, said hooks having wedge-shaped entrances, substantially as described.

WILLIAM P. WHITE.

Witnesses:
A. J. WILSON.
S. S. THRESHER.